US010056070B2

(12) United States Patent
Gautama

(10) Patent No.: US 10,056,070 B2
(45) Date of Patent: Aug. 21, 2018

(54) RECEIVER CIRCUIT

(71) Applicant: NXP B.V.

(72) Inventor: Temujin Gautama, Boutersem (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/841,917

(22) Filed: Dec. 14, 2017

(65) Prior Publication Data

US 2018/0174569 A1 Jun. 21, 2018

(30) Foreign Application Priority Data

Dec. 19, 2016 (EP) ..................................... 16205014

(51) Int. Cl.
G10K 11/178 (2006.01)
H04B 1/10 (2006.01)

(52) U.S. Cl.
CPC .. *G10K 11/17821* (2018.01); *G10K 11/17875* (2018.01); *H04B 1/1027* (2013.01)

(58) Field of Classification Search
None
See application file for complete search history.

(56) References Cited

U.S. PATENT DOCUMENTS

| 6,490,551 B2 | 12/2002 | Wiese et al. |
| 2007/0291876 A1 | 12/2007 | Shridhar et al. |
| 2010/0233988 A1* | 9/2010 | Kon ..................... H04B 1/1027 455/326 |
| 2013/0343576 A1* | 12/2013 | Pahuja ................... H04H 40/36 381/119 |
| 2014/0270252 A1 | 9/2014 | Pahuja et al. |
| 2014/0355764 A1* | 12/2014 | Elenes ................... H04H 20/88 381/3 |
| 2016/0049155 A1 | 2/2016 | Siemes |

FOREIGN PATENT DOCUMENTS

| EP | 1 370 016 A1 | 12/2003 |
| EP | 2 538 564 A1 | 12/2012 |
| EP | 2 858 277 A1 | 4/2015 |

* cited by examiner

Primary Examiner — Paul Huber
(74) Attorney, Agent, or Firm — Rajeev Madnawat

(57) ABSTRACT

A receiver circuit comprising a first-input-terminal configured to receive an analog-input-signal, which is representative of audio-data; and a second-input-terminal configured to receive a digital-input-signal, which is representative of the same audio-data as the analog-input-signal. The receiver circuit also includes a noise-estimator configured to determine a noise-signal that is representative of a difference between the analog-input-signal and the digital-input-signal; and a de-noiser that is configured to determine a de-noised-signal by applying a de-noising algorithm to the analog-input-signal based on the noise-signal.

15 Claims, 1 Drawing Sheet

RECEIVER CIRCUIT

CROSS-REFERENCE TO RELATED APPLICATIONS

This application claims the priority under 35 U.S.C. § 119 of European Patent application no. 16205014.0, filed on Dec. 19, 2016, the contents of which are incorporated by reference herein.

The present disclosure relates to receiver circuits, and in particular, although not exclusively, to car radio systems that can receive both analogue and digital transmissions, According to a first aspect of the present disclosure there is provided a receiver circuit comprising:
- a first-input-terminal configured to receive an analogue-input-signal, which is representative of audio-data;
- a second-input-terminal configured to receive a digital-input-signal, which is representative of the same audio-data as the analogue-input-signal;
- a noise-estimator configured to determine a noise-signal that is representative of a difference between the analogue-input-signal and the digital-input-signal; and
- a de-noiser that is configured to determine a de-noised-signal by applying a de-noising algorithm to the analogue-input-signal based on the noise-signal.

Such a receiver circuit can advantageously provide a de-noised signal that has a high quality because the digital-input-signal is used to improve the quality of the analogue-input-signal.

In one or more embodiments the noise-estimator is configured to determine a noise-signal that is representative of a difference between frequency-domain versions of the analogue-input-signal and the digital-input-signal.

In one or more embodiments the receiver circuit further comprises a spectral-aligner that is configured to spectrally align the analogue-input-signal and the digital-input-signal. The spectral-aligner may apply a spectral alignment gain factor to the analogue-input-signal or the digital-input-signal, in order to spectrally align the analogue-input-signal and the digital-input-signal.

In one or more embodiments the noise-estimator includes a control-input-terminal that is configured to receive a control-signal. The noise-estimator is configured to update the noise-signal only when the control-signal has a value that is indicative of the digital-input-signal being valid. If the control-signal has a value that is indicative of the digital-input-signal not being valid, the noise-estimator may be configured to maintain the noise-signal at a previous level. The previous level may be a level that was determined at an instant in time when the control-signal had a value that was indicative of the digital-input-signal being valid.

In one or more embodiments the analogue-input-signal and the digital-input-signal comprise signal portions in a plurality of different frequency bins. The noise-estimator may be configured to, for each of the plurality of frequency bins, determine a noise-frequency-bin signal that is representative of a difference between the corresponding signal portions of the analogue-input-signal and the digital-input-signal. The plurality of different frequency bins may be overlapping frequency bins.

In one or more embodiments the de-noised-signal is in the time domain, and receiver circuit further comprising a frequency-to-time-domain-converter configured to process the de-noised-signal and determine a time-domain-de-noised-signal.

In one or more embodiments the analogue-input-signal and the digital-input-signal are time-domain signals. The receiver circuit may further comprise: a first-time-to-frequency-domain-converter configured to receive the analogue-input-signal and convert it to a frequency-domain-analogue-input-signal; and a second-time-to-frequency-domain-converter configured to receive the digital-input-signal and convert it to a frequency-domain-digital-input-signal. The noise-estimator may be configured to determine the noise-signal such that it is representative of a difference between the frequency-domain-analogue-input-signal and the frequency-domain-digital-input-signal.

In one or more embodiments the noise-estimator comprises a subtractor that is configured to determine a difference between the analogue-input-signal and the digital-input-signal in order to provide an error-signal. The receiver circuit may also comprise a minimum-tracker-block configured to determine a minimum value of the error-signal from a preceding predetermined period of time, and provide this value as the noise-signal.

In one or more embodiments the receiver circuit further comprises a temporal-aligner that is configured to apply a time delay to the analogue-input-signal or the digital-input-signal, in order to temporally align the analogue-input-signal and the digital-input-signal.

In one or more embodiments the second-input-terminal is configured to receive a plurality of digital-input-signals, which are representative of the same audio-data as the analogue-input-signal. The receiver circuit may further comprise a control-input-terminal that is configured to receive a control-signal that is indicative of which of the plurality of digital-input-signals contains valid data. The noise-estimator may be configured to determine the noise-signal based on a digital-input-signal that contains valid data, in accordance with the control-signal.

According to a further aspect of the present disclosure there is provided a method of operating a receiver circuit, the method comprising:
- receiving an analogue-input-signal, which is representative of audio-data;
- receiving a digital-input-signal, which is representative of the same audio-data as the analogue-input-signal;
- determining a noise-signal that is representative of a difference between the analogue-input-signal and the digital-input-signal; and
- determining a de-noised-signal by applying a de-noising algorithm to the analogue-input-signal based on the noise-signal.

There may be provided an integrated circuit that comprises any receiver circuit disclosed herein, or is configured to perform any method disclosed herein.

There may be provided a hybrid radio system, such as a car radio system, that comprises any receiver circuit disclosed herein, or is configured to perform any method disclosed herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

Figure 1:
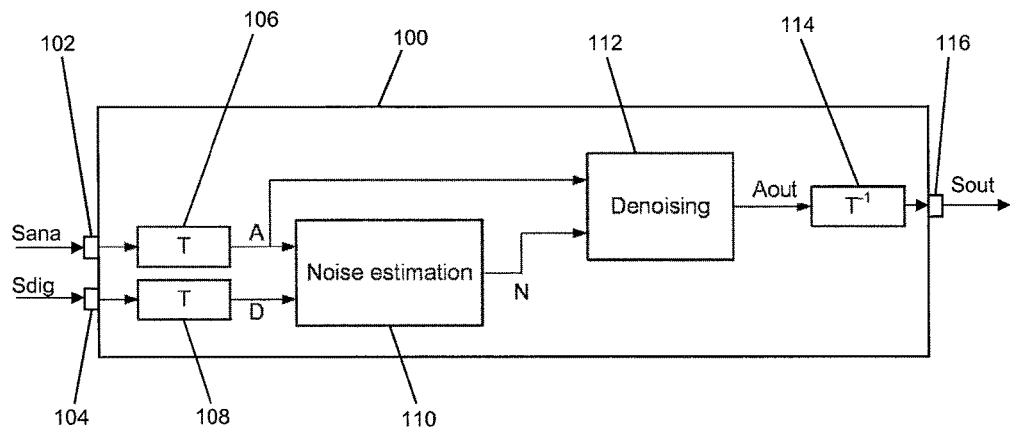
FIG. 1 shows an example embodiment of a receiver circuit.

Digital radio involves transmission and reception of radio signals that are encoded in the digital domain, as opposed to traditional analogue transmission/reception using amplitude modulation (AM) or frequency modulation (FM) systems. The received and decoded digital audio signals have a number of advantages over their analogue counterparts, such as a better sound quality, and a better robustness to radio interferences (multi-path interference, co-channel noise, etc.). There exist several digital radio systems that have been deployed, two of which are the Eureka 147 DAB system and the IBOC DAB system. The Eureka 147 DAB system is the digital radio system that is currently used around the world. This system broadcasts multiple stations in a single multiplex. The bandwidth within a multiplex can be divided unevenly across the stations, depending on the quality required for the station. The US use a different system called in-band on-channel (IBOC) DAB system. The digital radio broadcast signal is centred on the same frequency as an existing (corresponding) AM or FM analogue broadcast, but occupying the sidebands above and below the station's centre frequency. This means that both the digital and the analogue radio signals are transmitted simultaneously at the same tuning frequency.

Many radio stations that transmit digital radio also transmit the same programme in an analogue manner (AM or FM). For the IBOC DAB system, the digital and analogue broadcasts are centred on the same frequency, while for the Eureka 147 DAB system, the multiplex for the digital radio can be on a different frequency to the corresponding analogue FM or AM signal. When two broadcasts for the same radio programme are available (e.g., digital and analogue audio broadcasts), there is the possibility for the receiver to switch from one broadcast to the other, when the reception of one is worse than that of the other.

In digital audio signal transmissions, the received (encoded) signals may contain bit errors. The amount of bit errors increases as the reception quality deteriorates. If the bit errors are still present after all error detection and error correction methods have been applied, the corresponding audio frame may not be decodable anymore and is "corrupted" (either completely or only in part). During corrupted digital frames, there can be no audio and error concealment techniques can be used. This can lead to discontinuous audio where audio frames are muted. In this situation, the intermittently available audio can lead to a severely degraded audio experience, even though the audio is artefact-free when it is present.

In analogue audio signal transmissions, the effect of bad reception conditions varies. For FM, which transmits the audio sum and difference signals separately, the difference signal is the first to become noisy. In those cases, the signal can be reduced to a mono signal, effectively reducing the noise caused by the difference signal. If the reception quality degrades further, then the mono signal becomes more noisy. In AM transmission, the audio signal also becomes noisier as the reception quality degrades.

In a system that simultaneously receives the same audio programme over both an analogue and digital signal transmission, the system can initially output audio to a user based on the received digital broadcast. If the frequency of corrupted frames in the digital broadcast becomes too high, such that the amount of time that no audio is provided to a user is considered too much, the system/tuner may switch to the analogue broadcast. Such a switch may be automatically performed by the system even when the reception conditions for the analogue broadcast are not optimal (for example it is a noisy analogue stream). Nonetheless, the audio from an analogue broadcast can show a graceful degradation for degrading reception quality; for example, the noise level in the audio signal can increase gradually, but the desired audio signal can remain present in most cases. The continuity of the analogue stream can be preferred over an occasionally interrupted (muted) nature of the digital stream, even though the audio quality of the analogue stream is lower than that of the digital stream when the digital stream is available.

One or more examples disclosed herein can improve the audio that can be provided to a user based on the analogue stream, by using information that is derived from the digital stream (when it is not corrupted). This results in a beneficial combination of the 'audio continuity' of the analogue stream (since there are no corrupted frames), and the higher audio quality that is obtained from the digital stream (since it is audio without artefacts if it is not corrupted).

FIG. 1 shows an example embodiment of a receiver circuit 100. The receiver circuit 100 has a first-input-terminal 102 that receives an analogue-input-signal (Sana), which is a digital signal that is representative of audio-data, obtained from an analogue broadcast, and also has a second-input-terminal 104 that receives a digital-input-signal (Sdig). The digital-input-signal (Sdig) is a digital signal that is representative of the same audio-data as the analogue-input-signal (Sana), but obtained from a digital broadcast. These input signals, Sana and Sdig, are the audio signals from, respectively, the analogue and the digital broadcasts, that have been temporally and, optionally, spectrally aligned. In some examples, the receiver circuit 100 includes a temporal-aligner that is upstream of a noise-estimator 110, and can apply a time delay to the analogue-input-signal (Sana) or the digital-input-signal (Sdig), in order to temporally align the two signals. For ease of illustration, it is assumed that the input signals are mono, although the skilled person will readily appreciate that the functionality of FIG. 1 can be easily extended to multiple channels.

The receiver circuit 100 has an output-terminal 116, which in this example provides a time-domain-de-noised-signal (Sout) as an output signal. Advantageously the time-domain-de-noised-signal (Sout) can be representative of the audio data received at the input terminals, yet with an improved quality when compared with the analogue-input-signal (Sana), and with a reduced period of muted time when compared with the digital-input-signal (Sdig). As will be discussed below, these advantages can be achieved by using the digital-input-signal (Sdig) to improve the quality of the analogue-input-signal (Sana) when the digital-input-signal (Sdig) has not dropped out.

In this example, the analogue-input-signal (Sana) and the digital-input-signal (Sdig) are in the time domain, and as will be discussed below noise estimation and de-noising will be performed in the frequency domain. Therefore, the receiver circuit 100 includes an optional first-time-to-frequency-domain-converter 106 and an optional second-time-to-frequency-domain-converter 108. The first-time-to-frequency-domain-converter 106 receives the time-domain analogue-input-signal from the first-input-terminal 102 and converts it to a frequency-domain-analogue-input-signal (A), which is in the frequency domain. Similarly, the second-time-to-frequency-domain-converter 108 receives the time-domain digital-input-signal from the second-input-terminal 104 and converts it to a frequency-domain-digital-input-signal (D), which is in the frequency domain. These frequency converters can use a Fast Fourier Transform (FFT), a quadrature mirror filter (QMF), or another analysis filter bank that is known in the art for converting time domain signals to the frequency domain.

In other examples, the analogue-input-signal (Sana) and the digital-input-signal (Sdig) can be in the frequency domain. In which case the first-time-to-frequency-domain-converter 106 and the second-time-to-frequency-domain-converter 108 may not be required.

The receiver circuit 100 also includes a noise-estimator 110 that determines a noise-signal (N) that is representative of a difference between the frequency-domain-analogue-input-signal (A) and the frequency-domain-digital-input-signal (D) (this can also be considered as a difference between the analogue-input-signal (Sana) and the digital-input-signal (Sdig)). In this way, a noise estimate, N, can be determined from the combination of the spectra of the analogue-input-signal and the digital-input-signal. Further details of an example implementation of the noise-estimator 110 are provided below with reference to FIG. 2.

The receiver circuit 100 also includes a de-noiser 112, which determines a de-noised-signal (Aout) by applying a de-noising algorithm to the analogue-input-signal (Sana) (or in this instance a frequency domain equivalent of it: the frequency-domain-analogue-input-signal (A)) based on the noise-signal (N). An example of a de-noising algorithm is provided below. Since the de-noiser 112 operates in the frequency domain in this example, it can be considered as spectrally de-noising the analogue stream and providing the de-noised-signal (Aout) as a signal in the frequency domain.

Since the de-noiser 112 operates in the frequency domain, and since the output signal is desired in the time domain, a frequency-to-time-domain-converter 114 is included to process the de-noised-signal (Aout) in order to determine the time-domain-de-noised-signal (Sout). The frequency-to-time-domain-converter 114 can apply the inverse ("$T^{-1}$") of any of the transforms that are applied by the first-time-to-frequency-domain-converter 106 and the second-time-to-frequency-domain-converter 108. The time-domain-de-noised-signal (Sout) is then provided as an output signal from the output-terminal 116.

In some examples, the transform that is used for converting the input signals, Sana and Sdig, to the frequency domain can be such that it has a representation of multiple frequency regions/bins, which have a power or magnitude value associated with it (which is related to the amount of signal that is present in that frequency region/bin). That is, the analogue-input-signal and the digital-input-signal include signal portions in a plurality of different frequency bins. In some examples, the plurality of different frequency bins can be overlapping, in that the frequency bins can share some, but not all, of a frequency range with adjacent frequency bins.

For a Fast Fourier Transform (FFT), the frequency regions are non-overlapping and the number of frequency 'bins' depends on the size of the FFT. Each bin k has a complex-valued value associated with it. These complex-valued values can be referred to as $A_k$ for the frequency-domain-analogue-input signal 'A', and $D_k$ for the frequency-domain-digital-signal 'D'. The magnitude of these complex-valued values, $|A_k|$ and $|D_k|$, is related to the amount of signal energy in that frequency bin. For example, the "magnitude" may be a time-averaged bin-wise signal power estimate.

Audio processing using an FFT can also use an overlap-add operation, which is not shown in the figure in order to assist with clarity. In an overlap-operation, the input time-domain signal is processed in overlapping temporal segments that are windowed before computing the FFT. The resulting complex-valued spectrum is processed and the inverse FFT yields a temporal segment, which is then appropriately combined with the overlapping part of the previous temporal segment to yield the processed time-domain output signal.

Audio processing using a filterbank approach can use an analysis filter bank that converts a time-domain signal into a number of sub-band signals that correspond to a number of partly overlapping frequency regions. In this way, a time-to-frequency-domain-converter 106, 108 can provide a frequency-domain-input-signal that has a plurality of different frequency bins that are overlapping.

Figure 2:
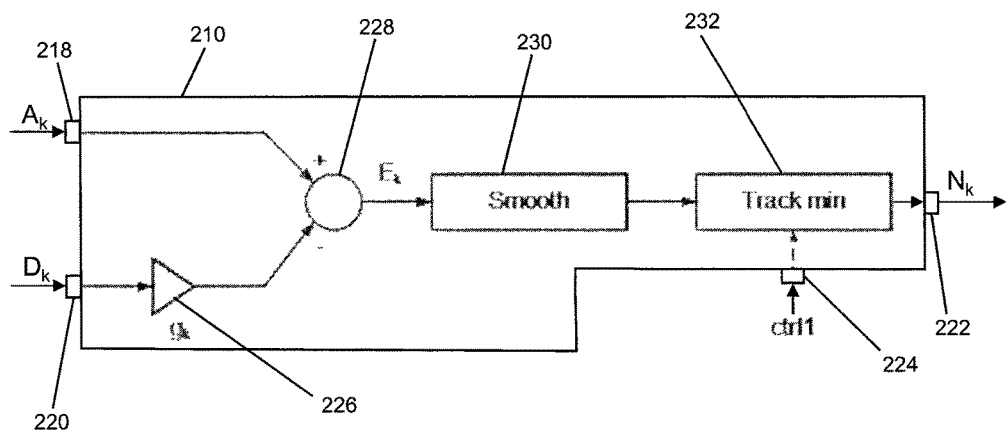
FIG. 2 shows an example implementation of noise-estimator.

FIG. 2 shows an example implementation of noise-estimator 210 that can estimate the noise for a single frequency bin k. The noise-estimator 210 has a first-noise-estimator-input-terminal 218 that receives an analogue-frequency-bin-signal $|A_k|$, which provides the magnitude for frequency bin k of the frequency-domain-analogue-input-signal (A). The noise-estimator 210 also has a second-noise-estimator-input-terminal 220 that receives a digital-frequency-bin-signal $|D_k|$, which provides the magnitude for frequency bin k of the frequency-domain-digital-input-signal (D).

In this example, the noise-estimator 210 includes an optional spectral-aligner 226. The spectral-aligner 226 applies a spectral alignment gain factor $g_k$ to the digital-frequency-bin-signal $|D_k|$ to spectrally align the analogue and digital streams. In other examples, a spectral-aligner can apply a spectral alignment gain factor $g_k$ to the analogue-frequency-bin-signal $|A_k|$. The spectral alignment gain factor $g_k$ can be a predetermined value, can be estimated by a component that is not shown in the figures, or can be estimated by the noise-estimator 210 on the basis of the difference between the analogue-frequency-bin signal $|A_k|$ and the digital-frequency-bin-signal $|D_k|$.

The noise-estimator 210 includes a subtractor 228 that determines a difference between the digital-frequency-bin-signal $|D_k|$ (or a spectrally aligned version of $|D_k|$ if a spectral-aligner has been used) and the analogue-frequency-bin-signal $|A_k|$. in this example, the subtractor 228 subtracts the spectrally aligned version of $|D_k|$ from the analogue-frequency-bin-signal $|A_k|$ in order to provide an error-signal $E_k$.

Since, in this example, the analogue-frequency-bin-signal $|A_k|$ and the digital-frequency-bin-signal $|D_k|$ have been temporally and spectrally aligned, the magnitudes should be approximately identical, assuming that the audio content of the analogue and the digital broadcasts are identical. Therefore, the difference in magnitude, $E_k=|A_k|-g_k|D_k|$, averaged across time, should be close to zero for each frequency bin k. If this is not the case, that is, if the difference is consistently non-zero over time, then there is a noise component in that frequency bin. Furthermore, the system can assume that this noise component is present on the analogue stream and not the digital one, since the digital stream, when it is not corrupted, is assumed to be artefact-free. In this way, the digital input signal can be used as a reference (noise-free) signal. The noise-estimator 210 can then estimate a noise-frequency-bin signal, $N_k$, from the error-signal, $E_k$, as discussed below.

In this example, the noise magnitude, $N_k$, is estimated by tracking the minimal value of the error-signal $E_k$ over a given time span (such as 1.5 seconds). The noise-estimator 210 includes a smoothing-block 230 that makes the noise estimate more robust to fast variations of $E_k$: it is assumed that the noise is stationary. The output signal from the smoothing-block 230 is connected to a minimum-tracker-block 232, which determines the minimum value of the output signal from the smoothing-block 230 from a preceding predetermined period of time, and provides these values as the noise-frequency-bin signal $N_k$. The noise magnitude spectrum, $\{N_k\}$, is obtained by repeating the above procedure for each frequency bin k.

When the digital audio stream D is obtained from a corrupt frame, the digital-frequency-bin-signal $|D_k|$ may contain all zeros due to an audio mute when the frame is corrupted. Alternatively, the digital-frequency-bin-signal $|D_k|$ may contain invalid data as a result of error concealment techniques. Either way, it can be advantageous for the digital-frequency-bin-signal $|D_k|$ not to be taken into account by the noise-estimator 210 when it does not contain valid data. In this way, the noise-estimator 210 can only perform noise estimation, to update the noise-frequency-bin signal $N_k$, when both audio streams contain valid data.

In this example, the noise-estimator 210 has a control-input-terminal 224, which receives a control-signal (ctrl1). The control-signal ("ctrl1") can indicate when the audio streams are valid. The control-signal (ctrl1) is processed by the minimum-tracker-block 232 in this example, such that the noise-frequency-bin signal $N_k$ is updated only when the control-signal (ctrl1) has a value that is indicative of the digital-input-signal being present or valid. When the control-signal (ctrl1) has a value that is indicative of the digital-input-signal not being present or valid, the noise-estimator 210/minimum-tracker-block 232/smoothing block 230 no longer changes the level of the noise-frequency-bin signal $N_k$ based on the error-signal $E_k$. In this instance, the noise-frequency-bin signal $N_k$, and therefore also the noise-signal, is maintained at previous levels that were determined at an instant in time when the control-signal (ctrl1) had a value that was indicative of the digital-input-signal being present or valid. In this example, this corresponds to an instant in time immediately before the digital-input-signal dropped out. Advantageously, this can still enable some de-noising to be performed by downstream components, using the best levels that were available before the digital-input-signal dropped out.

For the signals that are described above with reference to FIG. 2, the de-noiser of FIG. 1 can perform the following de-noising algorithm to reduce the noise in the frequency-domain-analogue-input signal 'A'. That is, the presence of the estimated noise magnitude spectrum $\{N_k\}$ in the magnitude spectrum of the analogue stream $\{A_k\}$ can be reduced. Spectral subtraction can be used to achieve this.

A spectral subtraction method determines a gain function, $G_k$, and the output frequency spectrum is obtained by multiplying the input with this gain function:

$$A\text{out}_k = A_k \cdot G_k \quad (1)$$

for each frequency bin k. The gain function can be computed in several ways, one example being:

$$G_k = \sqrt{\frac{|A_k|^2 - \alpha |N_k|^2}{|A_k|^2}}, \quad (2)$$

where α is a spectral over-subtraction factor. Other de-noising approaches can be used, for example based on the MMSE (minimum mean-square-error) or the MAP (maximum a posteriori) principles.

Finally, as discussed above with reference to the frequency-to-time-domain-converter 114, the output audio signal can be obtained by transforming the output frequency spectrum $\{A\text{out}_k\}$ to the time domain, thereby yielding time-domain-de-noised-signal Sout. This signal beneficially has the continuity of the received analogue signal, with the noise that can be present in the original analogue audio being reduced. Therefore, if a processor (not shown) makes a decision to blend audio output from signals received from the digital broadcast to signals received from the analogue broadcast (for example because the signal from the digital broadcast is dropping out too often), then the audio output from the analogue signal can have a better audio quality when compared to a system that blends to the original (unprocessed) analogue audio stream.

Therefore, if received analogue and digital streams are temporally and spectrally aligned, that is, if one stream is delayed such that it is synchronised with the other, and if one stream has been processed such that the spectral envelopes are, on average, approximately the same, then a consistent discrepancy in the spectral envelopes is an indication of the presence of noise in the analogue stream. Indeed, since the digital stream, when present, should not contain audio artefacts, it can be processed as a reference (noise-free) signal. The spectral envelope of the noise can be estimated by comparing the analogue stream to the (reference) digital one, and can be consequently used for de-noising the analogue stream. This leads to an improvement of the audio quality of the analogue stream, even when the digital stream is intermittently corrupted, because the noise is only estimated when the digital stream is valid, but can be used also when the digital stream is invalid. Therefore, when the audio switches to the analogue stream because the digital stream is corrupted too frequently, the audio can be of higher quality compared to the original analogue stream.

In some examples, the second-input-terminal can receive a plurality of digital-input-signals, which are representative of the same audio-data as the analogue-input-signal, and the noise-estimator 210 can process the plurality of digital-input-signals. The control-input-terminal 224 of the noise-estimator 210 can receive a control-signal (ctrl1) that is indicative of which of the plurality of digital-input-signals contains valid data. The noise-estimator 210 can thus determine the noise-frequency-bin signal $N_k$, and therefore also the noise-signal based on a digital-input-signal that contains valid data, in accordance with the control-signal (ctrl1). In this way, the noise-estimator 210 can ensure that any updates to the noise-frequency-bin signal $N_k$ are based on a valid digital-input-signal. Using a plurality of digital-input-signals can be beneficial because it can increase the likelihood that a valid digital signal is available for improving the quality of the analogue-input-signal.

One or more of the examples disclosed herein can thus improve the quality of an analogue stream using a (possibly only intermittently available) digital stream. This can be in contrast to blending approaches that first resort to error concealment techniques, after which a blending operation from digital to (unprocessed) analogue is performed. Examples described herein can be used as part of a hybrid radio that can simultaneously receive an AM or FM, and a digital radio broadcast of the same programme.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A receiver circuit comprising:
   a first-input-terminal configured to receive an analogue-input-signal, which is representative of audio-data;
   a second-input-terminal configured to receive a digital-input-signal, which is representative of the same audio-data as the analogue-input-signal;
   a noise-estimator configured to determine a noise-signal that is representative of a difference between the analogue-input-signal and the digital-input-signal; and
   a de-noiser that is configured to determine a de-noised-signal by applying a de-noising algorithm to the analogue-input-signal based on the noise-signal.

2. The receiver circuit of claim 1, wherein the noise-estimator is configured to determine a noise-signal that is representative of a difference between frequency-domain versions of the analogue-input-signal and the digital-input-signal.

3. The receiver circuit of claim 1, further comprising a spectral-aligner that is configured to spectrally align the analogue-input-signal and the digital-input-signal.

4. The receiver circuit of claim 1, wherein the noise-estimator includes a control-input-terminal that is configured to receive a control-signal, and wherein the noise-estimator is configured to update the noise-signal only when the control-signal has a value that is indicative of the digital-input-signal being valid.

5. The receiver circuit of claim 4, wherein, when the control-signal has a value that is indicative of the digital-input-signal not being valid, the noise-estimator is configured to maintain the noise-signal at a previous level.

6. The receiver circuit of claim 5, wherein the previous level is a level that was determined at an instant in time when the control-signal had a value that was indicative of the digital-input-signal being valid.

7. The receiver circuit of claim 1, wherein:
   the analogue-input-signal and the digital-input-signal comprise signal portions in a plurality of different frequency bins, and
   the noise-estimator is configured to, for each of the plurality of frequency bins, determine a noise-frequency-bin signal that is representative of a difference between the corresponding signal portions of the analogue-input-signal and the digital-input-signal.

8. The receiver circuit of claim 7, wherein the plurality of different frequency bins are overlapping frequency bins.

9. The receiver circuit of claim 1, wherein the de-noised-signal is in the frequency domain, and further comprising a frequency-to-time-domain-converter configured to process the de-noised-signal and determine a time-domain-de-noised-signal.

10. The receiver circuit of claim 1, wherein the analogue-input-signal and the digital-input-signal are time-domain signals, the receiver circuit further comprising:
    a first-time-to-frequency-domain-converter configured to receive the analogue-input-signal and convert it to a frequency-domain-analogue-input-signal; and
    a second-time-to-frequency-domain-converter configured to receive the digital-input-signal and convert it to a frequency-domain-digital-input-signal; and
    wherein the noise-estimator is configured to determine the noise-signal such that it is representative of a difference between the frequency-domain-analogue-input-signal and the frequency-domain-digital-input-signal.

11. The receiver circuit of claim 1, wherein the noise-estimator comprises:
    a subtractor that is configured to determine a difference between the analogue-input-signal and the digital-input-signal in order to provide an error-signal; and
    a minimum-tracker-block configured to determine a minimum value of the error-signal from a preceding predetermined period of time, and provide this value as the noise-signal.

12. The receiver circuit of claim 1, further comprising a temporal-aligner that is configured to apply a time delay to the analogue-input-signal or the digital-input-signal, in order to temporally align the analogue-input-signal and the digital-input-signal.

13. The receiver circuit of claim 1, wherein:
    the second-input-terminal is configured to receive a plurality of digital-input-signals, which are representative of the same audio-data as the analogue-input-signal;
    the receiver circuit further comprising:
        a control-input-terminal that is configured to receive a control-signal that is indicative of which of the plurality of digital-input-signals contains valid data; and
    wherein:
        the noise-estimator is configured to determine the noise-signal based on a digital-input-signal that contains valid data, in accordance with the control-signal.

14. A hybrid radio system comprising the receiver circuit of claim 1.

15. A method of operating a receiver circuit, the method comprising:
    receiving an analogue-input-signal, which is representative of audio-data;
    receiving a digital-input-signal, which is representative of the same audio-data as the analogue-input-signal;
    determining a noise-signal that is representative of a difference between the analogue-input-signal and the digital-input-signal; and
    determining a de-noised-signal by applying a de-noising algorithm to the analogue-input-signal based on the noise-signal.

* * * * *